(12) United States Patent
Meinke et al.

(10) Patent No.: US 7,281,745 B1
(45) Date of Patent: Oct. 16, 2007

(54) VEHICULAR REAR-MOUNTED CARGO EXTENDER

(75) Inventors: Joseph S. Meinke, Gowen, MI (US); Thomas R. Futryk, Grand Haven, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 0 days.

(21) Appl. No.: 11/163,617

(22) Filed: Oct. 25, 2005

Related U.S. Application Data

(60) Provisional application No. 60/522,654, filed on Oct. 25, 2004.

(51) Int. Cl.
*B60P 3/40* (2006.01)

(52) U.S. Cl. ............... 296/26.1; 296/26.08; 296/26.09; 296/37.1; 296/37.6

(58) Field of Classification Search ............... 296/37.1, 296/37.6, 37.14, 26.01, 26.08, 26.09, 26.1, 296/26.11, 57.1
See application file for complete search history.

(56) References Cited

U.S. PATENT DOCUMENTS

| | | | |
|---|---|---|---|
| 1,572,815 A | 2/1926 | Schultz et al. | |
| 1,747,458 A | 2/1930 | Russell et al. | |
| 1,815,943 A | 7/1931 | Glenn | |
| 2,052,483 A | 8/1936 | Monteith | |
| 2,063,092 A | 12/1936 | Groden | |
| 2,080,989 A | 5/1937 | Smith | |
| 2,131,746 A | 10/1938 | Morrison | |
| 2,160,958 A | 6/1939 | Critchlow | |
| 3,338,620 A | 8/1967 | Cauviv | |
| 3,554,415 A | 1/1971 | Woods | |
| 3,682,360 A | 8/1972 | Fletcher et al. | |
| 3,796,456 A | 3/1974 | Bergeson et al. | |
| 4,131,209 A * | 12/1978 | Manning | 414/537 |
| 4,228,936 A | 10/1980 | Rife | |
| 4,274,648 A | 6/1981 | Robins | |
| 4,312,620 A | 1/1982 | Muschalek, Jr. | |
| 4,624,619 A * | 11/1986 | Uher | 414/537 |
| 4,676,415 A | 6/1987 | Kennedy | |
| 5,026,243 A * | 6/1991 | Dell | 414/401 |
| 5,040,467 A * | 8/1991 | King | 108/42 |
| 5,080,417 A * | 1/1992 | Kanai | 296/37.3 |
| 5,133,634 A * | 7/1992 | Gingrich et al. | 414/537 |
| 5,135,274 A | 8/1992 | Dodd | |
| 6,196,612 B1* | 3/2001 | Grimes | 296/65.05 |
| 6,328,366 B1* | 12/2001 | Foster et al. | 296/37.6 |
| 6,364,392 B1* | 4/2002 | Meinke | 296/62 |
| 6,454,338 B1* | 9/2002 | Glickman et al. | 296/57.1 |
| 6,474,715 B2 | 11/2002 | Fukushima et al. | |
| 6,659,525 B2* | 12/2003 | Delavalle et al. | 296/37.2 |
| 6,932,404 B2* | 8/2005 | Vejnar | 296/26.09 |
| 2002/0121794 A1* | 9/2002 | Vejnar | 296/50 |

* cited by examiner

*Primary Examiner*—D. Glenn Dayoan
*Assistant Examiner*—Greg Blankenship
(74) *Attorney, Agent, or Firm*—McGarry Bair PC

(57) ABSTRACT

A vehicle having a cargo extender mounted to a rear portion thereof, preferably a minivan or a sport utility vehicle, is provided. The cargo extender is preferably slidable between a retracted position stowed in an aesthetically-pleasing manner within the rear portion of the vehicle and an extended position where any contents of the extender can be accessed. Further, the cargo extender can be pivoted to different angular positions (as opposed to the generally horizontal position in which it is stored) to provide additional functionality thereto.

21 Claims, 6 Drawing Sheets

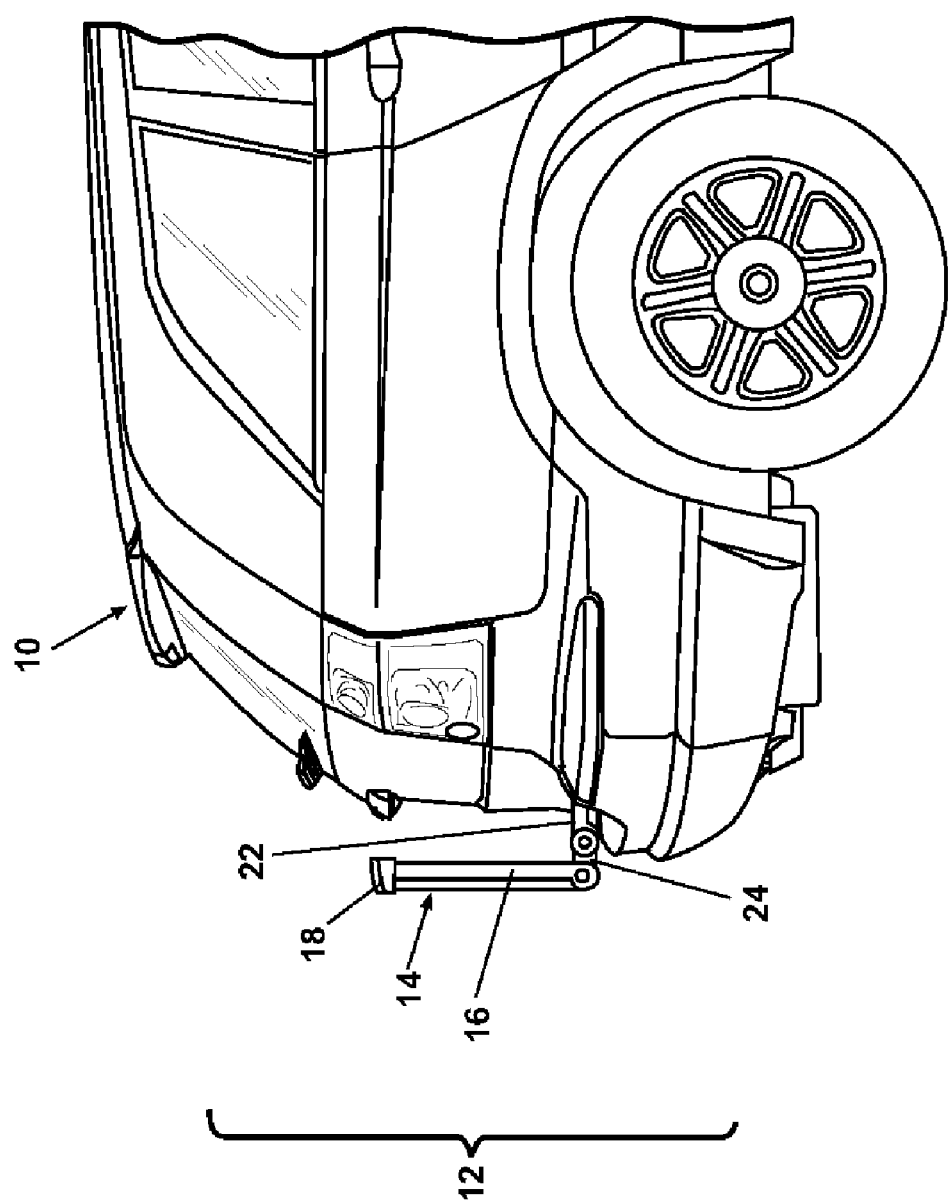

VEHICULAR REAR-MOUNTED CARGO EXTENDER

CROSS-REFERENCE TO RELATED APPLICATION

This application claims the benefit of U.S. provisional application Ser. No. 60/522,654, filed Oct. 25, 2004, which is incorporated herein in its entirety.

FIELD OF THE INVENTION

The invention relates to a cargo extender mounted between a retracted and an extended position from a rear body area of a minivan or a sport utility vehicle. In various embodiments of the invention, the rear-mounted cargo extender can also be articulated to various multifunctional positions, such as a vertical to act as a rack and downward to act as a step.

DESCRIPTION OF THE RELATED ART

With the increase in popularity of the minivan and sport utility vehicle (SUV), it has been found that there is a continuous desire to increase the stowing capacity of these vehicles and/or to increase their functionality.

SUMMARY OF THE INVENTION

This invention relates to a vehicle having a cargo extender mounted to a rear portion of a vehicle, preferably a minivan or a sport utility vehicle. The cargo extender is slidable between a retracted position stowed in an aesthetically-pleasing manner within the rear portion of the vehicle and an extended position where any contents of the extender can be accessed. Further, the cargo extender can be pivoted to different angular positions (as opposed to the generally horizontal position in which it is stored) to provide additional functionality to the cargo extender according to the invention.

In one aspect, the invention relates to a vehicular rear-mounted cargo extender comprising: a base comprising a support surface; a first strut and a second strut mounted generally to opposing side portions of the base, wherein the struts are adapted to be mounted to a vehicle in a location generally beneath a rear storage location of a vehicle; and a fascia extending across a rear portion of the base, the fascia having an exterior surface configured to match an exterior styling surface of the vehicle adjacent the rear storage location of the vehicle. The first strut and the second strut are thereby mounted to the vehicle between a retracted position and an extended position.

In another aspect, the invention relates to a vehicle having a vehicular rear-mounted cargo extender comprising: a vehicle having a rear storage location and an exterior styling surface surrounding the rear storage location; the cargo extender comprising: a base comprising a support surface; a first strut and a second strut mounted generally to opposing side portions of the base, wherein the struts are mounted to the vehicle in a location generally beneath the rear storage location; and a fascia extending across a rear portion of the base, the fascia having an exterior surface configured to match the exterior styling surface of the vehicle adjacent the rear storage location. The first strut and the second strut are thereby mounted to the vehicle between a retracted position and an extended position and, whereby, when the cargo extender is mounted to the vehicle and positioned in the retracted position, the fascia is positioned so that the exterior styling surface and the exterior surface of the fascia are generally contiguous.

Various embodiments of the invention are contemplated. For example, each of the first strut and the second strut can each comprise a rearward strut portion mounted to the base and a forward strut portion adapted to be mounted to the vehicle. The rearward and forward strut portions are thereby separated by a pivot, wherein the pivot allows pivotal movement of the rearward strut portion with respect to the forward strut portion as selected by a user.

The pivot can allow the rearward strut portion to be positioned in a depending angular position with respect to the forward strut portion. The pivot can allow the rearward strut portion to be positioned in an upward angular position with respect to the forward strut portion. The upward angular position can be a generally vertical angle.

An actuator can be operably interconnected to the pivot to allow a user to fixedly and selectively position the rearward strut portion with respect to the forward strut portion. The rear storage location of the vehicle can comprise at least one of a trunk, a rear hatchback, a rear liftgate. The vehicle can comprise at least one of a sport utility vehicle and a crossover utility vehicle.

BRIEF DESCRIPTION OF THE DRAWINGS

FIG. 6 is a side elevational view of the rear-mounted cargo extender shown in FIG. 1, shown located in the upwardly-pivoted position.

DESCRIPTION OF THE PREFERRED EMBODIMENT

Figure 1:
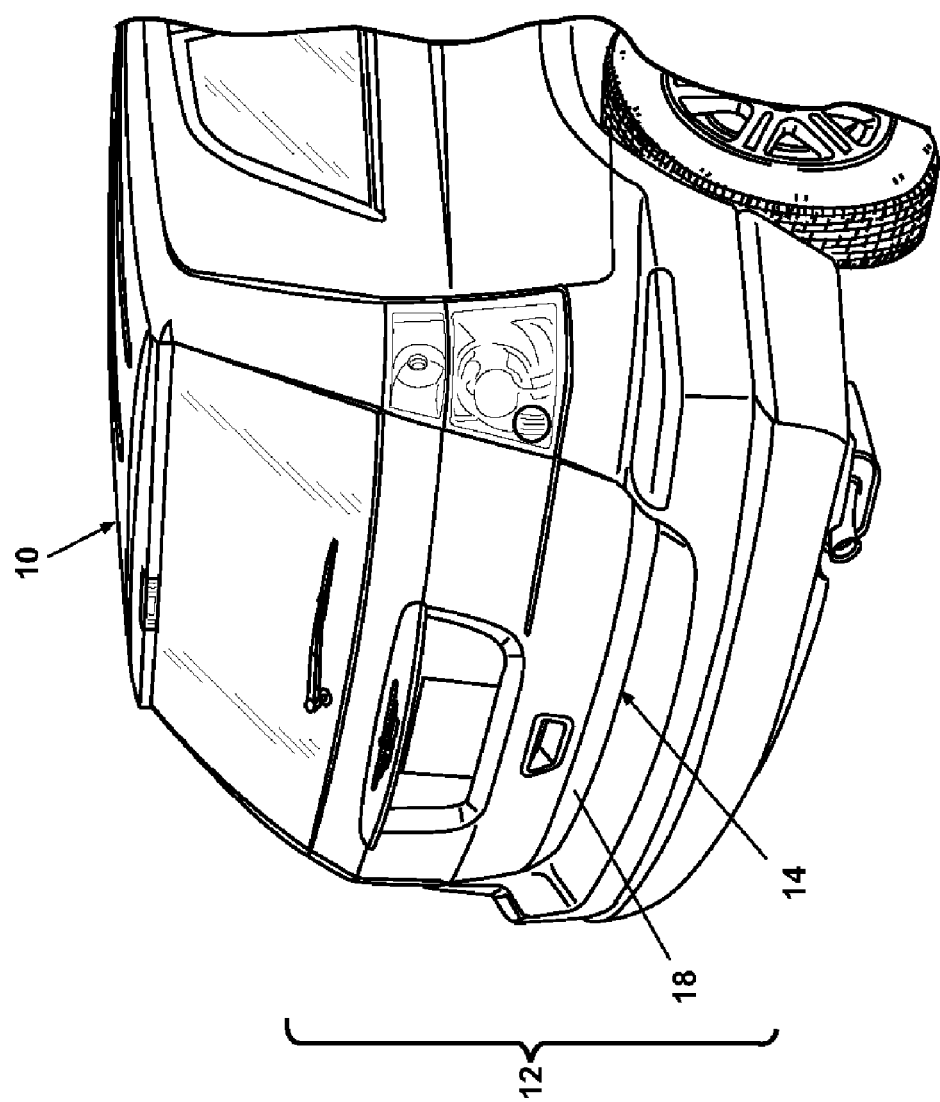
FIG. 1 is a perspective view of a vehicle having a rear-mounted cargo extender according to the invention.
Figure 2:
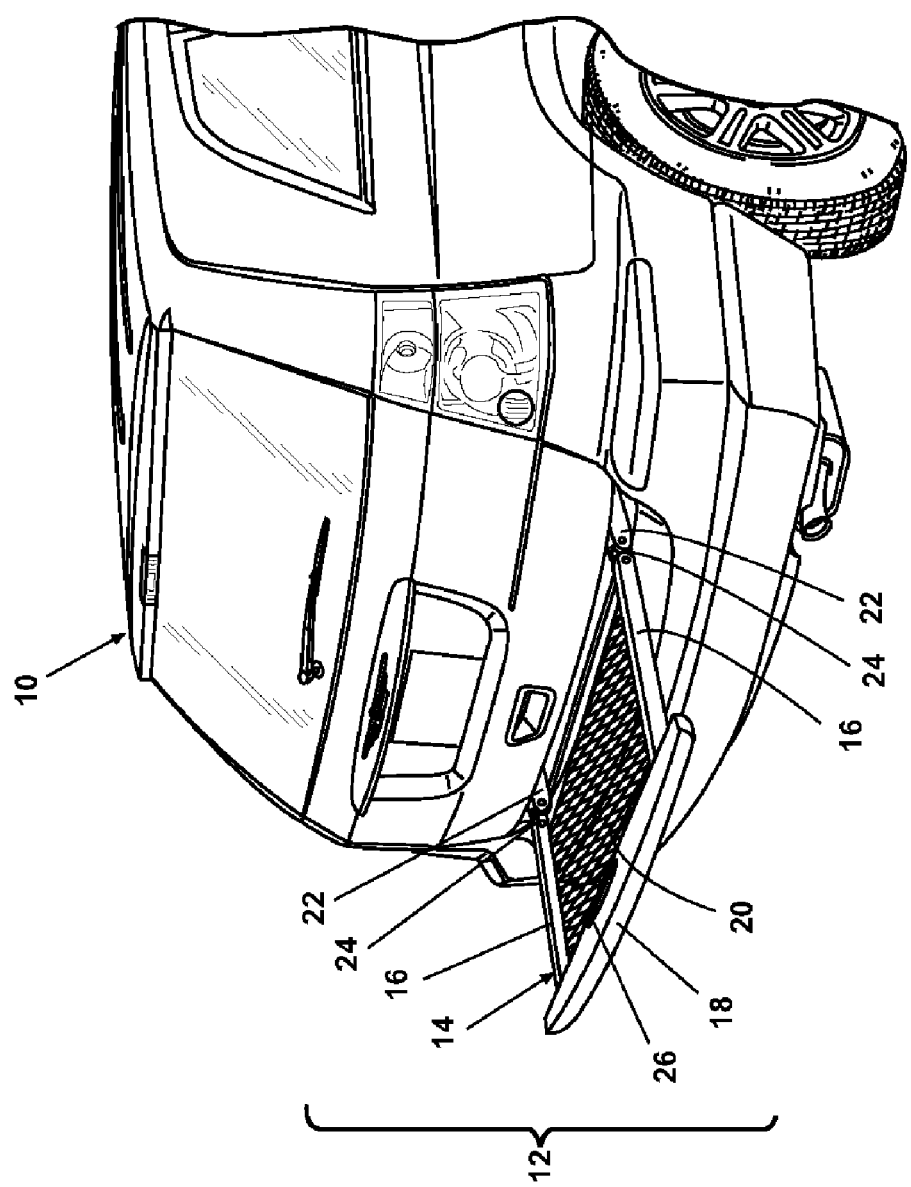
FIG. 2 is a perspective view of a vehicle having the rear-mounted cargo extender shown in FIG. 1, the rear-mounted cargo extender shown in an extended position.

With reference to the drawings and to FIGS. 1-2 in particular, a vehicle 10 having a rear area 12 is shown having a cargo extender 14 mounted thereto and movable between a retracted position as shown in FIG. 1 and an extended position as shown in FIG. 2. In the retracted position of FIG. 1, the cargo extender 14 is still stowed within the rear area 12 of the vehicle 10 and preferably has an outer fascia 18 forming an aesthetically-pleasing interaction with the styling of the rear area 12 of the vehicle 10. In the extended position of FIG. 2, the cargo extender 14 is extended along a generally horizontal plane out of the rear area 12 of the vehicle 10 so that any contents of the cargo extender 14 can be accessed by a user of the vehicle 10.

Figure 3:
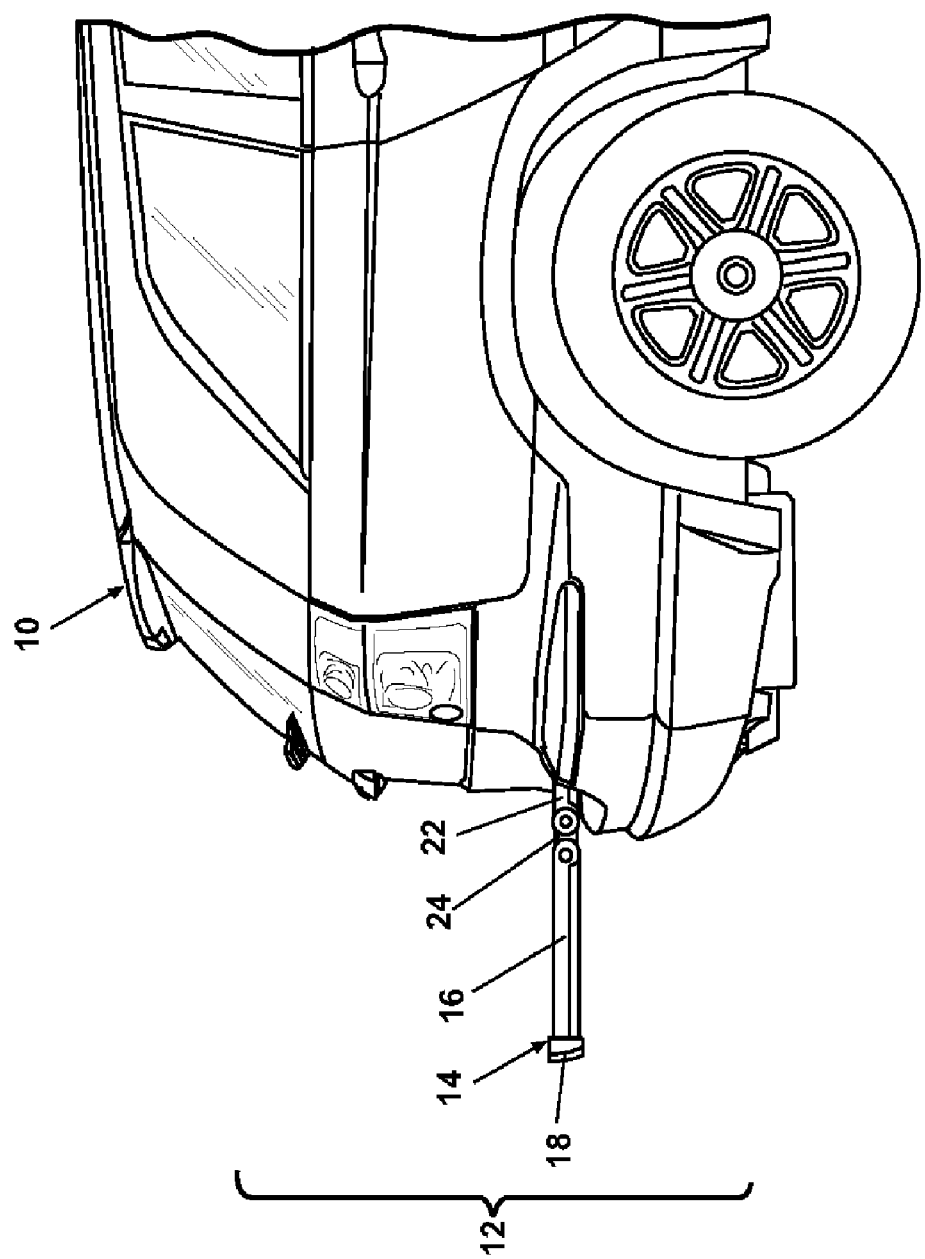
FIG. 3 is a side elevational view of the rear-mounted cargo extender shown in FIG. 1 shown in the extended position.

With reference to FIGS. 2-3, the cargo extender 14 preferably comprises a extender-or tray-like structure formed by a pair of lateral struts 16 which form side rails of the cargo extender 14 and terminate at each corresponding outward end thereof to the fascia 18 of the cargo extender 14. The cargo extender 14 has a base 20 which can be any suitable lower surface of the cargo extender 14, such as the meshwork shown in FIG. 2.

A pair of mounting struts 22 are mounted to the interior of the rear area 12 of the vehicle 10 and are preferably slidably mounted with respect to the rear area 12 of the vehicle 10. The mounting struts 22 are interconnected to the cargo extender struts 16 by a multifunctional pivot joint 24. A suitable embodiment of the multifunctional pivot joint 24 is shown in U.S. Pat. No. 6,364,392, issued Apr. 2, 2002, commonly assigned to the owner of this invention described herein, and which is incorporated herein by reference in its entirety. The struts 16 and the mounting struts 22 can be formed in any suitable manner to create the desired movement of the cargo extender 14 as described herein. However, it should be noted that the mounting post assemblies in the above-incorporated patent are suitable for this purpose.

Figure 4:
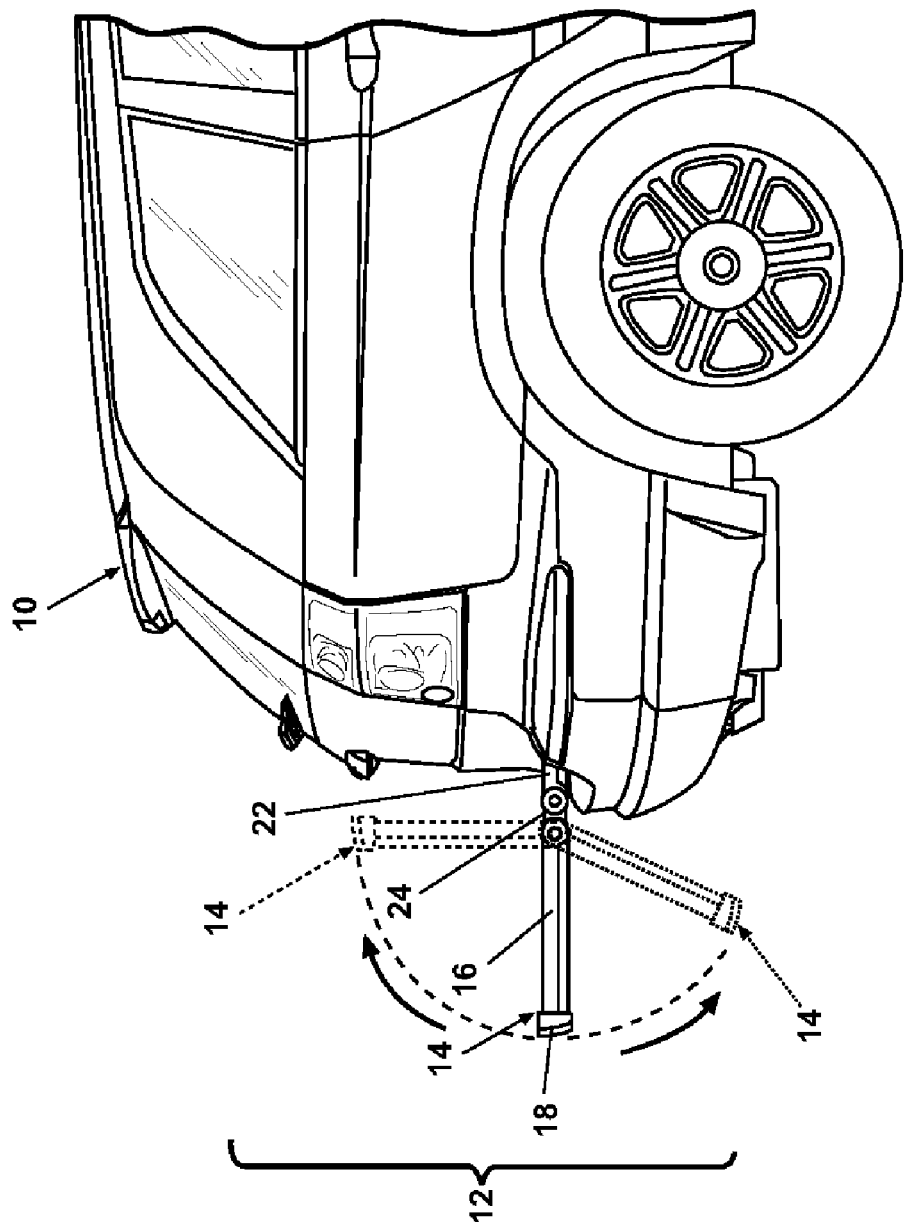
FIG. 4 is a side elevational view of the rear-mounted cargo extender shown in FIG. 1, shown in the extended position and illustrating the pivotal movement of the cargo extender between upwardly-pivoted and downwardly-pivoted positions shown in phantom lines.
Figure 5:
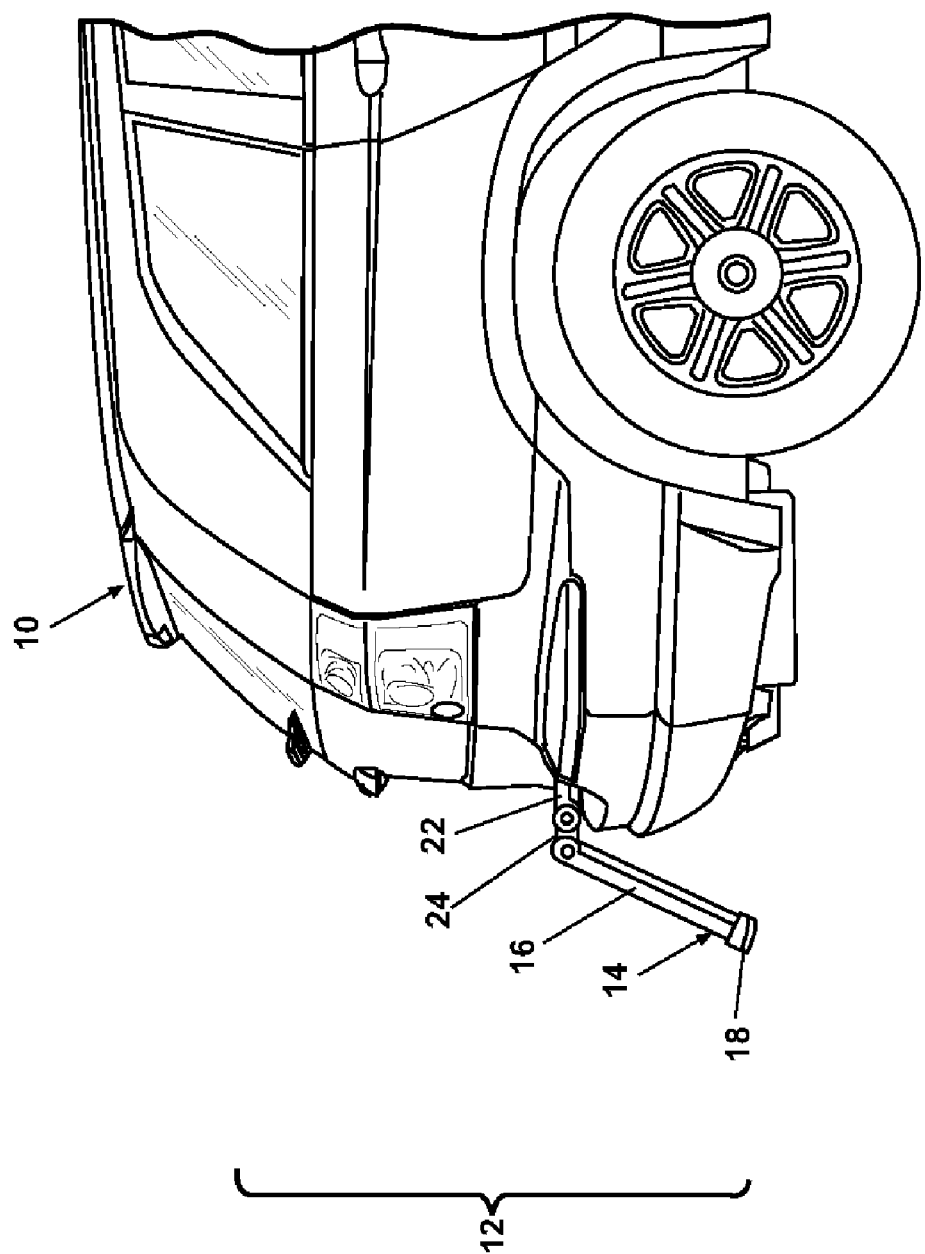
FIG. 5 is a side elevational view of the rear-mounted cargo extender shown in FIG. 1, shown located in the downwardly-pivoted position.

The multifunctional pivot joint 24 preferably has more than one function and assists in the positioning of the cargo extender 14 relative to the rear area 12 of the vehicle 10. The articulation provided to the cargo extender 14 relative to the rear area 12 of the vehicle 10 is shown in FIG. 4 by the cargo extender 14 shown in its generally standard horizontal position in solid lines. A first upwardly articulated position is shown in phantom lines wherein the cargo extender 14 can be used as a rack such as for bicycles. A second downwardly articulated position is shown in phantom lines in which the cargo extender 14 can be used to assist a user into stepping into the rear area 12 of the vehicle 10, such as when a liftgate is open and the user needs to access the contents behind the liftgate. The articulated positions of the cargo extender 14 relative to the rear area 12 of the vehicle 10 are shown in solid lines in FIGS. 5-6.

Use of the cargo extender 14 is relatively straightforward. The cargo extender 14 would be typically stored in the retracted position shown in FIG. 1 whereby the fascia 18 forms an aesthetically-pleasing interface with the remainder of the rear area 12 of the vehicle 10. When a user desires to access the cargo extender 14, the user simply releases the cargo extender 14 from the retracted position and slides the cargo extender 14 outwardly from the rear area 12 of the vehicle 10 into the extended position such as that shown in FIG. 2 in the drawings. The user can articulate an actuator 26 to perform such release functions as: releasing the cargo extender from the retracted position to the extended position, and articulating the cargo extender 14 from a generally horizontal position into either an upwardly or downwardly articulated position.

The cargo extender 14 which is preferably positioned in a rear area 12 of the vehicle 10 described herein according to the invention provides benefits over prior art minivans and sport-utility vehicles without such stowage-enhancing features. A user of the vehicle 10 can store additional cargo within the cargo extender 14 and carry the cargo within the interior of the vehicle 10 in a concealed manner. A user of the vehicle 10 can also use the cargo extender in an upwardly articulated position while operating the vehicle 10 to carry items on the cargo extender positioned in the extended position, such as bicycles or other things to be carried on the rear of the vehicle. A user the vehicle 10 can also use the cargo extender 14 in a downwardly articulated position, for example, such as by a step to assist the user of the vehicle 10 to climb into the rear area 12 of the vehicle 10.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicular rear-mounted cargo extender for a vehicle having a rear storage compartment with a rear-facing opening, an exterior styling surface surrounding the rear storage compartment, and a gate pivotally associated with the rear storage compartment wherein the gate can move between an open position providing access to the rear storage compartment through the rear-facing opening and a closed position completely closing the rear-facing opening, the vehicular rear-mounted cargo extender comprising:
    a base comprising a support surface having opposing side edges;
    a first strut and a second strut pivotally connected to the opposing side edges, wherein the struts are adapted to be movably mounted to a vehicle in a location generally beneath a rear storage compartment of a vehicle; and
    a fascia extending across a rear portion of the base, the fascia having an exterior surface configured to match an exterior styling surface of a vehicle adjacent a rear storage compartment;
    wherein the cargo extender can be moved between a retracted position beneath a rear storage compartment and an extended position away from a rear storage compartment to provide a supplemental rear storage area irrespective of a position of a gate.

2. The cargo extender of claim 1 wherein each of the first strut and the second strut each comprise a rearward strut portion mounted to the base, a forward strut portion adapted to be mounted to a vehicle, and wherein the rearward and forward strut portions are separated by the pivot connection, wherein the pivot connection allows pivotal movement of the rearward strut portion with respect to the forward strut portion as selected by a user.

3. The cargo extender of claim 2 wherein the pivot connection allows the rearward strut portion to be positioned in a depending angular position with respect to the forward strut portion.

4. The cargo extender of claim 3 wherein the pivot connection allows the rearward strut portion to be positioned in an upward angular position with respect to the forward strut portion.

5. The cargo extender of claim 4 wherein the upward angular position is a generally vertical angle.

6. The cargo extender of claim 5 and further comprising an actuator operably interconnected to the pivot connection to allow a user to fixedly and selectively position the rearward strut portion with respect to the forward strut portion.

7. The cargo extender of claim 2 and further comprising an actuator operably interconnected to the pivot connection to allow a user to fixedly and selectively position the rearward strut portion with respect to the forward strut portion.

8. The cargo extender of claim 1 wherein the vehicle comprises at least one of a sport utility vehicle and a crossover utility vehicle.

9. The cargo extender of claim 1 wherein the rear rear-facing opening is closable by a gate other than a tailgate.

10. The cargo extender of claim 9 wherein the gate comprises at least one of a trunk lid, a rear hatchback, and a rear liftgate.

11. A vehicle having a vehicular rear-mounted cargo extender comprising:

a vehicle having a rear storage compartment with a rear-facing opening, an exterior styling surface surrounding the rear storage compartment, and a gate pivotally associated with the rear storage compartment wherein the gate can move between an open position providing access to the rear storage compartment through the rear-facing opening and a closed position completely closing the rear-facing opening;

the cargo extender comprising:
   a base comprising a support surface having opposing side edges;
   a first strut and a second strut pivotally connected to the opposing side edges, wherein the struts are mounted to the vehicle in a location generally beneath the rear storage compartment; and
   a fascia extending across a rear portion of the base, the fascia having an exterior surface configured to match the exterior styling surface of the vehicle adjacent the rear storage compartment;
wherein the cargo extender can be moved between a retracted position beneath the rear storage compartment and an extended position away from the rear storage compartment to provide a supplemental rear storage area irrespective of the position of the gate;
whereby, when the cargo extender is positioned in the retracted position, the fascia is positioned so that the exterior styling surface and the exterior surface of the fascia are generally contiguous.

12. The vehicle of claim 11 wherein each of the first strut and the second strut each comprise a rearward strut portion mounted to the base, a forward strut portion mounted to the vehicle, and wherein the rearward and forward strut portions are interconnected by the pivot connection, wherein the pivot allows pivotal movement of the rearward strut portion with respect to the forward strut portion as selected by a user.

13. The vehicle of claim 12 wherein the pivot connection allows the rearward strut portion to be positioned in a depending angular position with respect to the forward strut portion.

14. The vehicle of claim 13 wherein the pivot connection allows the rearward strut portion to be positioned in an upward angular position with respect to the forward strut portion.

15. The vehicle of claim 14 wherein the upward angular position is a generally vertical angle.

16. The vehicle of claim 15 and further comprising an actuator operably interconnected to the pivot connection to allow a user to fixedly and selectively position the rearward strut portion with respect to the forward strut portion.

17. The vehicle of claim 12 and further comprising an actuator operably interconnected to the pivot connection to allow a user to fixedly and selectively position the rearward strut portion with respect to the forward strut portion.

18. The cargo extender of claim 11 wherein the rear rear-facing opening is closable by a gate other than a tailgate.

19. The vehicle of claim 18 wherein the gate comprises at least one of a trunk lid, a rear hatchback, and a rear liftgate.

20. The vehicle of claim 11 wherein the vehicle comprises at least one of a sport utility vehicle and a crossover utility vehicle.

21. A vehicle having a vehicular rear-mounted cargo extender comprising:
   a vehicle having a rear storage compartment with a rear-facing opening, and an exterior styling surface surrounding the rear storage compartment, the cargo extender comprising:
     a base comprising a support surface having opposing side edges;
     a first strut and a second strut pivotally attached to the opposing side edges, wherein the struts are mounted to the vehicle in a location generally beneath the rear storage compartment; and
     a fascia extending across a rear portion of the base, the fascia having an exterior surface configured to match the exterior styling surface of the vehicle adjacent the rear storage compartment;
   wherein the cargo extender can be moved between a retracted position beneath the rear storage compartment and an extended position away from the rear storage compartment to provide a supplemental rear storage area irrespective of the presence or position of a gate adapted to close the rear-facing opening;
   whereby, when the cargo extender is positioned in the retracted position, the fascia is positioned so that the exterior styling surface and the exterior surface of the fascia are generally contiguous.

* * * * *

UNITED STATES PATENT AND TRADEMARK OFFICE
CERTIFICATE OF CORRECTION

| | |
|---|---|
| PATENT NO. | : 7,281,745 B1 |
| APPLICATION NO. | : 11/163617 |
| DATED | : October 16, 2007 |
| INVENTOR(S) | : Joseph S. Meinke |

It is certified that error appears in the above-identified patent and that said Letters Patent is hereby corrected as shown below:

Column 2, lines 64-66 reads: "With reference to FIGS. 2-3, the cargo extender 14 preferably comprises a extender-or tray-like structure formed by a pair of lateral struts 16 which form side rails of"

It should read: --With reference to FIGS. 2-3, the cargo extender 14 preferably comprises an extender or tray-like structure formed by a pair of lateral struts 16 which form side rails of--

Column 3, line 12 reads: "commonly assigned to the owner of this invention described herein"

It should read: --commonly assigned to the owner of the invention described herein--

Column 3, line 53 reads: "and sport-utility vehicles without such stowage-enhancing"

It should read: --and sport utility vehicles without such stowage-enhancing--

Column 3, lines 61-64 reads: "A user the vehicle 10 can also use the cargo extender 14 in a downwardly articulated position, for example, such as by a step to assist the user of the vehicle 10 to climb into the rear area 12 of the vehicle 10."

It should read: --A user of the vehicle 10 can also use the cargo extender 14 in a downwardly articulated position, for example, such as a step to assist the user of the vehicle 10 to climb into the rear area 12 of the vehicle 10.--

UNITED STATES PATENT AND TRADEMARK OFFICE
CERTIFICATE OF CORRECTION

PATENT NO. : 7,281,745 B1
APPLICATION NO. : 11/163617
DATED : October 16, 2007
INVENTOR(S) : Joseph S. Meinke It is certified that error appears in the above-identified patent and that said Letters Patent is hereby corrected as shown below:

Column 4, claim 9 reads: "9. The cargo extender of claim 1 wherein the rear rear-facing opening is closable by a gate other than a tailgate."

It should read: --9. The cargo extender of claim 1 wherein the rear-facing opening is closable by a gate other than a tailgate.--

Signed and Sealed this

Fifteenth Day of April, 2008

JON W. DUDAS
*Director of the United States Patent and Trademark Office*